(12) United States Patent
McConnell et al.

(10) Patent No.: US 6,181,025 B1
(45) Date of Patent: Jan. 30, 2001

(54) INTEGRAL INTERROGATOR-COIL CIRCUIT

(75) Inventors: John E. McConnell, Ann Arbor; Eric Krupp, Canton, both of MI (US)

(73) Assignee: Lear Corporation, Southfield, MI (US)

( * ) Notice: Under 35 U.S.C. 154(b), the term of this patent shall be extended for 0 days.

(21) Appl. No.: 09/316,581

(22) Filed: May 21, 1999

(51) Int. Cl.$^7$ .................................................. B60R 25/00
(52) U.S. Cl. .......................... 307/10.2; 70/277; 70/278.1; 340/825.69; 340/825.72
(58) Field of Search ................................. 307/10.2, 10.1; 180/287; 340/825.31, 825.69, 825.72; 70/413, 277, 278.3, 278.1; 123/179.3

(56) References Cited

U.S. PATENT DOCUMENTS

| | | | |
|---|---|---|---|
| 5,532,522 | * 7/1996 | Dietz et al. | 340/825.31 |
| 5,724,028 | * 3/1998 | Prokup | 340/825.72 |
| 5,889,603 | * 3/1999 | Roddy et al. | 340/825.31 |
| 6,035,677 | * 3/2000 | Janssen et al. | 70/278.3 |

* cited by examiner

Primary Examiner—Albert W. Paladini
(74) Attorney, Agent, or Firm—Niro, Scavone, Haller & Niro

(57) ABSTRACT

An integrated, flexible interrogator-coil circuit provides security for the type of lock opened by a key that transmits a coded signal to an interrogator circuit associated with the lock. When the key is inserted into the lock, a coil in the key is brought into proximity with an energized coil associated with the lock. The resulting current induced in the key's coil causes the key to transmit the coded signal. If the coded signal is recognized by the lock's interrogator circuit, the key opens the lock. The lock coil is an etched metallic spiral on a loop portion of the circuit board and the interrogator circuit components are mounted on a base portion of the circuit board on which is etched a metallic circuit pattern. The integrated interrogator-coil circuit is faster and more economical to manufacture. Because the circuit is on a flexible circuit board, it can be made a part of the lock assembly itself, thus facilitating use of this type of security system. The invention is particularly useful in securing the ignition systems of vehicles, although it can be used for other applications.

15 Claims, 2 Drawing Sheets

INTEGRAL INTERROGATOR-COIL CIRCUIT

BACKGROUND OF THE INVENTION

1. Field of the Invention

The present invention relates to an interrogator circuit for a lock and, more particularly, to an interrogator-coil circuit integrated on a circuit board.

2. Description of Related Art

A simple lock-and-key arrangement in some circumstances is deemed insufficiently secure to protect valuable or dangerous items. Unauthorized persons with enough expertise can often open a lock by somehow duplicating the key. This is especially true for automobiles, in which a traditional key-lock ignition can be defeated by an experienced car thief. However, it is equally true for other items.

One approach to this problem has been to use an "interrogator" circuit, which in an automobile is incorporated into the ignition circuitry. The interrogator circuit, mounted in the vehicle, activates the ignition circuit to permit the vehicle engine to be started. The interrogator circuit has a decoder programmed to activate the ignition only when it receives from the key the particular coded signal preprogrammed into the interrogator for that vehicle. By matching the interrogator and the key, a different key, even one that fits the vehicle ignition lock, will not start the engine.

The system is implemented by providing an electromagnetic coil in the vehicle. The coil is typically a wire wound around a bezel surrounding the key opening in the vehicle ignition lock. The vehicle coil in the bezel cooperates with a corresponding coil embedded in the handle of the vehicle ignition key. When the ignition key is inserted into the ignition lock, the vehicle coil, which is always energized, is brought into proximity with a coil in the key handle to induce a current in it. The induced current in turn activates an RF transmitter in the key handle. The transmitter emits a signal with a signature (say a particular frequency) recognized by the interrogator circuit's decoder, and the interrogator circuit activates the ignition and starts the vehicle engine. This type of system requires no independent source of electrical power in the key.

This is a very effective approach, and has application beyond vehicle ignition locks. However, the mere fact that the system comprises multiple components makes it more expensive both to manufacture and install. As presently implemented the vehicle coil consists of copper wire wound on a spool in the bezel, which makes it expensive to manufacture. In addition, the interrogator circuit is typically located remote from the ignition lock, necessitating separate wiring for the different system components, adding further to the expense attributable to system installation.

SUMMARY OF THE INVENTION

It is an object of the present invention to avoid these shortcomings of prior art interrogator systems.

It is another object of the invention to provide an integrated interrogator-coil circuit for use with a lock capable of being opened by a key, which circuit comprises a flexible circuit board having a coil portion and a base portion, an electrical coil on the coil portion for inducing an electric current in a coil in the key when the key is placed in position to open the lock, and an interrogator circuit on the base portion for decoding a coded signal transmitted by the key in response to the electric current induced therein.

In accordance with one aspect of the invention, an interrogator-coil assembly for use with a lock capable of being opened by a key comprises an integrated interrogator-coil circuit on a flexible circuit board having a coil portion with a central opening and a base portion, the circuit including an electrical coil on the coil portion, and an interrogator circuit on the base portion for decoding a coded signal transmitted by the key in response to an electric current induced in a coil in the key, and a housing for accepting the lock, the circuit board being mounted to the housing for permitting access to the lock by the key, wherein the housing includes a coil-mounting portion to which the coil is mounted at a location for inducing an electric current in a coil in the key when the key is placed in position to open the lock and a circuit-holding portion to which the base portion is mounted.

In accordance with a more specific embodiment of the invention, a vehicle ignition lock assembly comprises an integrated interrogator-coil circuit on a flexible circuit board having a coil portion with a central opening and a base portion, the circuit including an electrical coil formed on the coil portion by etching a spiral pattern from a metallic foil adhered to a surface of the circuit board, and an interrogator circuit for decoding a coded signal transmitted by a vehicle ignition key in response to an electric current induced in a coil in the ignition key, the interrogator circuit providing a signal to circuitry in the vehicle to enable the engine thereof to be started only if the interrogator circuit can decode the signal from the key, wherein the interrogator circuit includes circuit components electrically connected by an electrically conductive circuit pattern formed by etching a metallic foil adhered on a surface of the base portion, and a housing for mounting the assembly on a vehicle ignition lock tumbler, the circuit board being mounted to the housing for permitting access to the lock tumbler by the ignition key, wherein the housing includes a coil-mounting portion to which the coil is mounted at a location for inducing an electric current in a coil in the key when the key is placed in the ignition lock tumbler and a circuit-holding portion to which the base portion is mounted.

In such a vehicle ignition lock assembly, the present invention further provides that the flexible circuit board is substantially planar and T-shaped in planform, with the cross portion of the T comprising the base portion and the upright portion of the T terminating in a generally circular loop comprising the coil portion, the interrogator-coil circuit includes connectors on the circuit board for connecting the coil and the interrogator circuit to associated circuitry in the vehicle, the housing is generally circularly cylindrical with a front recess comprising the loop-holding portion and a rear recess for accepting the ignition lock tumbler, wherein the circuit-holding portion comprises an outside surface of the rear recess and the base portion is wrapped around the outside surface, a bezel secured to a front edge of the housing to hold the loop in place in the front recess, and a rear cover fitting around the base portion to secure the vehicle lock tumbler within the rear recess and holding the base portion in place on the outside surface, the rear cover including an access opening for permitting vehicle electrical connectors to be connected to said interrogator-coil circuit connectors.

In such a vehicle ignition lock assembly, the present invention also provides that the flexible circuit board is substantially planar and has a base portion substantially rectangular in planform with a stem extending from a side of the rectangle and terminating in a generally circular loop comprising the coil portion, the interrogator-coil circuit includes connectors on the circuit board for connecting the coil and the interrogator circuit to associated circuitry in the vehicle, the housing includes a generally circularly cylindrical portion with a front recess comprising the loop-holding portion and a rear recess for accepting the vehicle lock tumbler, wherein said circuit-holding portion comprises an enclosure holding the rectangular portion in a plane at an angle to a plane of the loop, the enclosure including an access opening for permitting vehicle electrical connectors to be connected to the interrogator-coil circuit connectors, and a bezel secured to a front edge of the housing to hold the loop in place in the front recess.

BRIEF DESCRIPTION OF THE DRAWINGS

The present invention will be better understood from the detailed description of its preferred embodiments which follows below, when taken in conjunction with the accompanying drawings, in which like numerals refer to like features throughout. This brief identification of the drawing figures will aid in understanding the detailed description that follows.

DETAILED DESCRIPTION OF THE PREFERRED EMBODIMENTS

Figure 1:
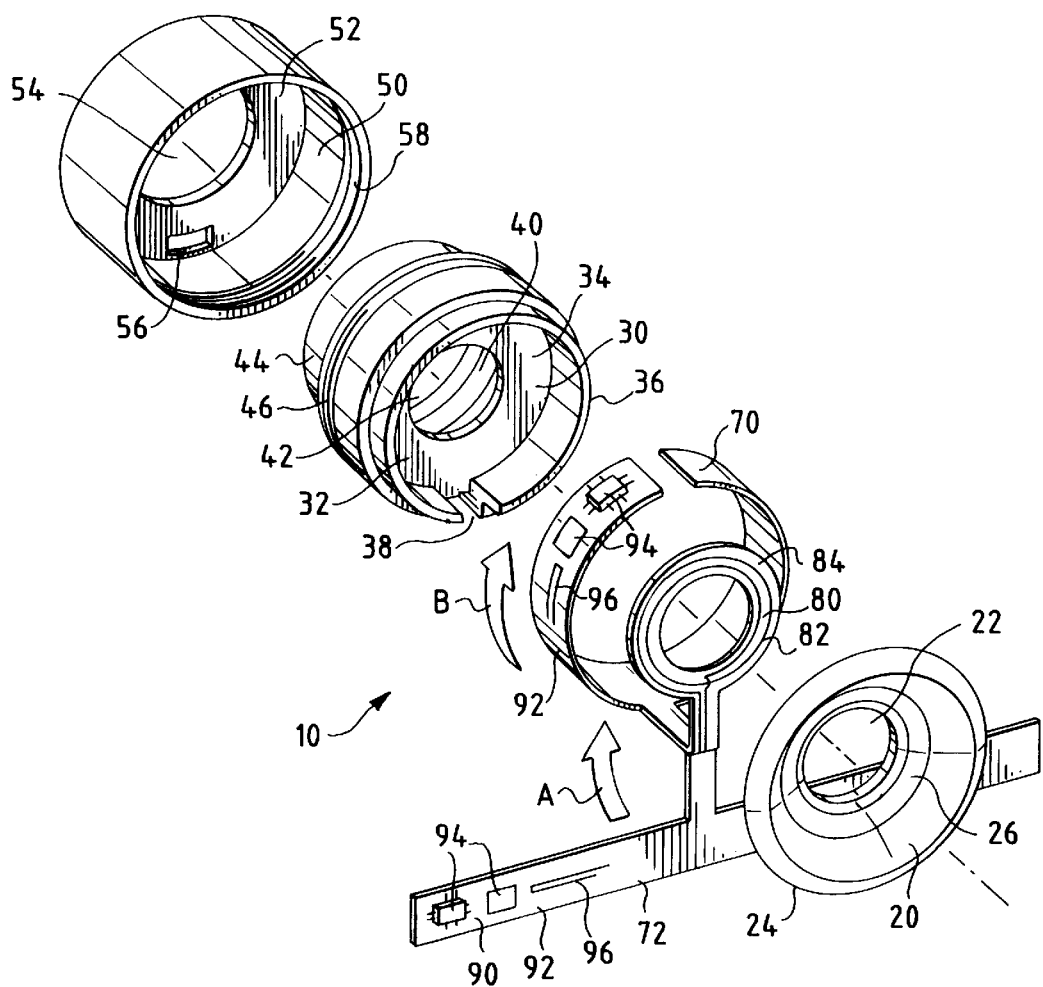
FIG. 1 is an exploded perspective view of a vehicle ignition lock assembly incorporating an integrated interrogator-coil circuit according to one embodiment of the present invention.

FIG. 1 depicts a vehicle ignition lock assembly 10 with the parts thereof shown exploded along a central axis of the assembly. An entire vehicle tumbler assembly includes a mechanical lock that accepts a conventional ignition key to start the vehicle engine. Since those parts are conventional, they are omitted from FIG. 1 so that the details of the present invention can be seen more clearly.

The lock assembly 10 includes a front bezel 20 that provides a decorative cover when the assembly 10 is attached to structure in the vehicle adapted to receive it. Typically, the lock assembly is mounted to a vehicle ignition lock tumbler in the vehicle steering column. The bezel 20 is molded of a high-impact plastic and includes a central opening 22 through which the ignition key is inserted into the ignition lock tumbler. The bezel includes an outer rim 24 that provides a lip forming a circumferential recess (not shown) behind the rim 24 on its reverse side. The bezel is also formed with a flat inner portion 26 surrounding the opening 22.

The lock assembly 10 also includes a hollow, generally cylindrical housing 30. The housing includes a front recess 32 having a separator plate 34 that forms the floor of the front recess 32. The front recess is bounded by a front flange 36 with a radial slot 38. The housing 30 also includes a rear recess 40 that is accessible through a central opening 42 in the separator plate 34. The rear recess 42 accepts the ignition lock tumbler (not shown), which fits snugly within the rear recess. A rear flange bounds the rear recess 40 and has a smooth outer surface 44. A circumferential ridge 46 extends around the housing 30. The housing is typically molded in one piece from a suitable high impact plastic, preferably of the same material as the bezel 20.

A rear cover 50, also molded in one piece of a high impact plastic material, is generally hollow and cylindrical, with an end closure 52. The end closure has a central opening 54 to accommodate the ignition lock tumbler, which will typically include a portion extending axially beyond the end of the rear flange of the housing 30. The end closure 52 includes an access slot 56 that permits a vehicle wiring connector (not shown) to be connected to an integrated interrogator-coil circuit to be described below. The rear cover 50 further includes a circumferential recess 58 around the inside of the forward rim thereof.

The integrated interrogator-coil circuit 70 according to this embodiment of the invention is fabricated on a single flexible circuit board 72. The coil 80 and the interrogator circuit 90 are fabricated on a flat sheet of any known flexible circuit board material, such as a polyimide. The circuit board blank is T-shaped (shown as an inverted "T" in phantom lines in FIG. 1), with the upright leg of the T terminating in a circular loop 82 on which the coil 80 is formed as discussed in detail below. The cross piece 92 of the T provides a base portion that carries the interrogator circuit, as discussed in detail below.

The coil 80 is fabricated by first depositing a copper film on the circuit board blank and then etching it to form a flat spiral coil 80 of up to about 80 windings on the surface of the loop 82. That is, a radial line across the loop 82 will intersect up to about 80 bands of the copper film, each band being a minimum of about 0.1 mm wide, to form the coil's "windings." FIG. 1 shows the coil 80 etched on one side of the loop 82 and the lead from the last inner turn of the spiral pattern passing across the outer turns. In practice, a conductor attached to one of the ends of the spiral coil may be passed through the circuit board to the rear surface of the loop and then back to the front surface for connection to a corresponding electrical lead. Alternatively, a layer of insulation can be placed on an inward-spiraling coil pattern and then an outward-spiraling pattern formed on top of the insulation layer. This enables the formation of a coil with additional turns. The manner in which these layers are formed to provide the coil 80 on the circuit board is conventional and need not be described in more detail to enable one skilled in the art to construct suitable coil on the loop's surface.

The loop 82 has an outer diameter substantially the same as the inner diameter of the front recess 32 of the housing 30. The inner diameter of the loop is substantially the same as, or slightly larger than, the diameter of the central opening 42 in the separator plate 34 of the housing 30.

The interrogator circuit 90 comprises conventional components, represented schematically at 94, electrically connected by a circuit pattern represented schematically at 96, etched from the copper film deposited on the circuit board blank. Again, the manner of fabricating the interrogator circuit on the circuit board blank is conventional and need not be described in additional detail.

To assemble the lock assembly 10, the coil 80 of the interrogator-coil circuit is placed within the front recess 32 of the housing 30, with the upright leg of the T-shaped circuit board extending through the slot 38. The upright leg is then folded in the direction of the arrow A to extend axially along the outside of the housing 30. Preferably, an axial slot (not shown) is formed in the housing 30 to accommodate the upright leg as it extends axially along the housing exterior. The cross piece 92 of the T-shaped circuit board carrying the interrogator circuit 90 is then wrapped around the smooth outside surface 44 of a rear flange on the housing, as shown by the arrow B.

The bezel 20 snaps onto the edge of the front flange 36 of the housing 30. The flat inner portion 26 of the bezel holds the loop 82 firmly in place against the separator plate 34. The circumferential recess 58 in the rear cover 50 snaps over the circumferential ridge 46 on the housing 30. The rear cover thus covers the interrogator circuit 90.

The entire assembly is then attached to the vehicle lock tumbler (not shown) secured to the vehicle. The vehicle lock tumbler typically includes a slightly enlarged head portion accepted by the rear recess 40 of the housing. A small lip formed around the inside of the rear flange is captured by the enlarged head of the lock tumbler to hold the lock assembly 10 firmly in place.

The coil 80 and the interrogator circuit 90 have leads etched in the copper film on the circuit board terminating in pin connectors (not shown) suitably located on the circuit board for connection to a cooperating vehicle pin connector (not shown) that fits through the access slot 56 in the rear cover 50.

The present invention thus provides an easily fabricated, integrated interrogator-coil circuit that can be connected to the necessary electrical components in the vehicle by a single connector. The invention eliminates the necessity of winding a wire around the bezel and the concomitant difficulty in providing connections to the coil within the confines of the ignition lock. The invention also reduces manufacturing costs because it uses conventional circuit board technology to fabricate both the coil and the interrogator circuit. That the integrated interrogator-coil circuit is on a flexible circuit board is also a significant feature of the present invention, because it permits it to be incorporated into a lock with little or no alteration of the lock's basic configuration. That is important because it avoids the necessity of making expensive modifications to the structure of the vehicle (or other item with which the invention is used).

Figure 2:
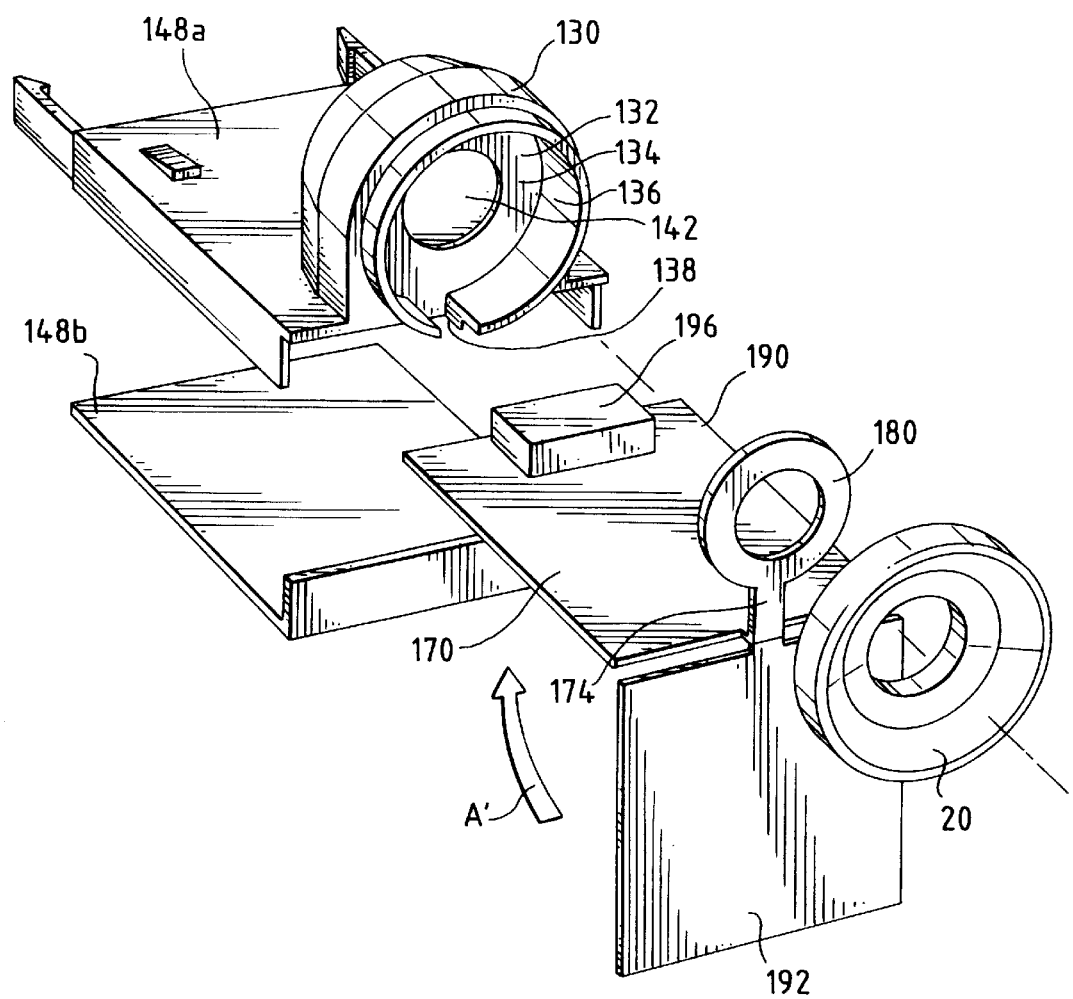
FIG. 2 is an exploded perspective view of a vehicle ignition lock assembly incorporating an integrated interrogator-coil circuit according to an alternate embodiment of the present invention.

FIG. 2 depicts an alternate embodiment of the invention that provides additional security while exploiting all of the advantages of the invention. Components in FIG. 2 that correspond to components in FIG. 1 are identified by corresponding "100-series" reference numerals. A detailed explanation thereof will not be necessary to an understanding of the embodiment in FIG. 2.

A vehicle interrogator circuit will generally include the ignition relay that energizes the ignition coil and starter motor of the vehicle. If the ignition relay is too easily accessible, unauthorized persons may be able to start the vehicle without the ignition key. This embodiment of the invention address that concern by incorporating a slightly different shape circuit board 190 and rear housing 130.

The circuit board 190 has a generally rectangular base portion 192 on which the interrogator circuit is fabricated, using the techniques described in detail above. The rear housing 130 includes a cylindrical portion with a front recess 132 and a front flange 136. In contrast to the housing 30 in the first embodiment, the housing 130 includes a box that comprises two parts. The top part 148a is integrally molded with the cylindrical portion. The bottom part 148b is molded separately.

The coil portion 180 of the interrogator-coil circuit 170 is assembled as in the previous embodiment. That is, the coil is inserted into the front recess 132 with the stem 174 connecting it to the rectangular portion extending through the slot 138. The coil 180 is held in place by the bezel 20, in the same fashion as the previous embodiment. The interrogator circuit 190 is folded in the direction of the arrow A' and captured within the box formed by connecting together the bottom portion 148b to the top portion 148a. In this manner the interrogator circuit, with the ignition relay, is inaccessible because it is within a box.

The box formed by connecting together the portions 148a and 148b has a rear opening (not shown) that provides access to a vehicle connector that plugs into the connector 196 on the circuit board. This connector is connected to the circuitry on the circuit board (both the coil and the interrogator circuit) as in the previous embodiment. The connector 196 can be placed in any convenient location on the base portion of the circuit board.

The present invention thus adapts itself to numerous configurations that ensure security while reducing the manufacturing and assembly costs associated with the previous coil and interrogator arrangements.

It will be clear to those skilled in the art that the terms "key" and "lock" as used herein are not limited to a key that controls a mechanical tumbler lock into which a toothed key is inserted. Rather, the terms are meant to include any combination of devices, one of which, the "lock," prevents unauthorized access, and the other of which, the "key," is inserted, or at least brought into proximity with, the lock. The key could, for example, be a magnetized card that fits into a slot that controls a lock. Or the key might be passed over a magnetized surface to deactivate the lock. The integrated interrogator-coil circuit can be used with those any other types of key-lock arrangements.

It should also be clear that the present invention, although described in connection with a vehicle ignition system, is not so limited. It can be used to ensure the security of valuables or other items that use key access. Other examples are a gun with a locking device that requires a key to enable the gun to be fired, a home entry door and any other locking device using a keyed closure.

Accordingly, while preferred embodiments of the invention have been depicted and described, it will be understood that various changes and modifications can be made other than those specifically mentioned above without departing from the spirit and scope of the invention, which is defined solely by the claims that follow.

What is claimed is:

1. An integrated interrogator-coil circuit for use with a lock capable of being opened by a key, the circuit comprising:

a flexible circuit board having a coil portion and a base portion;

an electrical coil on said coil portion for inducing an electric current in a coil in the key when the key is placed in position to open the lock; and an interrogator circuit on said base portion for decoding a coded signal transmitted by the key in response to the electric current induced therein.

2. An integrated interrogator-coil circuit as in claim 1, wherein:

said electrical coil comprises a metallic pattern formed by etching a metallic foil adhered to a surface of said circuit board; and said interrogator circuit comprises a metallic circuit pattern formed by etching a metallic foil adhered to the surface of said circuit board and circuit components electrically connected to said circuit pattern.

3. An integrated interrogator-coil circuit as in claim 2, wherein:

said flexible circuit board is substantially planar and T-shaped in planform, with the cross portion of the T comprising said base portion and said upright portion of the T terminating in a generally circular loop comprising said coil portion;

said electrical coil comprises a spiral pattern on said loop; and said loop is dimensioned for acceptance into a circular recess in a housing for holding the lock, with said cross portion of the T-shaped circuit board wrapped around the periphery of the housing at a location spaced from said circular recess.

4. An integrated interrogator-coil circuit as in claim 2, wherein:

said flexible circuit board is substantially planar and has a base portion substantially rectangular in planform with a stem extending from a side of the rectangle and terminating in a generally circular loop comprising said coil portion;

said electrical coil comprises a spiral pattern on said loop; and said loop is dimensioned for acceptance into a circular recess in a housing for holding the lock, with said rectangular portion lying in a plane at an angle to a plane of said loop.

5. An interrogator-coil assembly for use with a lock capable of being opened by a key, the assembly comprising:

an integrated interrogator-coil circuit on a flexible circuit board having a coil portion with a central opening and a base portion, said circuit including an electrical coil on said coil portion, and an interrogator circuit on said base portion for decoding a coded signal transmitted by the key in response to an electric current induced in a coil in the key; and a housing for accepting the lock, said circuit board being mounted to said housing for permitting access to the lock by the key, wherein said housing includes a coil-mounting portion to which said coil is mounted at a location for inducing an electric current in a coil in the key when the key is placed in position to open the lock and a circuit-holding portion to which said base portion is mounted.

6. An interrogator-coil assembly as in claim 5, wherein:

said flexible circuit board is substantially planar and T-shaped in planform, with the cross portion of the T comprising said base portion and said upright portion of the T terminating in a generally circular loop comprising said coil portion;

said housing is generally circularly cylindrical with a front recess comprising said loop-holding portion and a rear recess for accepting the lock, wherein said circuit-holding portion comprises an outside surface of said rear recess and said base portion is wrapped around said outside surface;

a bezel secured to a front edge of said housing to hold said loop in place in said front recess; and a rear cover fitting around said base portion for securing the lock within said rear recess and holding said base portion in place on said outside surface.

7. An interrogator-coil assembly as in claim 6, wherein:

said coil is formed by etching a spiral pattern from a metallic foil adhered on a surface of said coil portion; and said interrogator circuit includes circuit components electrically connected by an electrically conductive circuit pattern formed by etching a metallic foil adhered on a surface of on said base portion.

8. An interrogator-coil assembly as in claim 5, wherein:

said flexible circuit board is substantially planar and has a base portion substantially rectangular in planform with a stem extending from a side of the rectangle and terminating in a generally circular loop comprising said coil portion;

said housing includes a generally circularly cylindrical portion with a front recess comprising said loop-holding portion and a rear recess for accepting the lock, wherein said circuit-holding portion comprises an enclosure holding said rectangular portion in a plane at an angle to a plane of said loop; and a bezel secured to a front edge of said housing to hold said loop in place in said front recess.

9. An interrogator-coil assembly as in claim 8, wherein:

said coil is formed by etching a spiral pattern from a metallic foil adhered on a surface of said coil portion; and said interrogator circuit includes circuit components electrically connected by an electrically conductive circuit pattern formed by etching a metallic foil adhered on a surface of on said base portion.

10. An interrogator-coil assembly as in claim 5, wherein said interrogator-coil circuit includes connectors on said circuit board for connecting said coil and said interrogator circuit to associated circuitry in a unit secured by the lock.

11. A vehicle ignition lock assembly comprising:

an integrated interrogator-coil circuit on a flexible circuit board having a coil portion with a central opening and a base portion, said circuit including an electrical coil formed on said coil portion by etching a spiral pattern from a metallic foil adhered to a surface of the circuit board, and an interrogator circuit for decoding a coded signal transmitted by a vehicle ignition key in response to an electric current induced in a coil in the ignition key, said interrogator circuit providing a signal to circuitry in the vehicle to enable the engine thereof to be started only if the interrogator circuit can decode the signal from the key, wherein said interrogator circuit includes circuit components electrically connected by an electrically conductive circuit pattern formed by etching a metallic foil adhered on a surface of said base portion; and a housing for mounting the assembly on a vehicle ignition lock tumbler, said circuit board being mounted to said housing for permitting access to the lock tumbler by the ignition key, wherein said housing includes a coil-mounting portion to which said coil is mounted at a location for inducing an electric current in a coil in the key when the key is placed in the ignition lock tumbler and a circuit-holding portion to which said base portion is mounted.

12. A vehicle ignition lock assembly as in claim 11, wherein:

said flexible circuit board is substantially planar and T-shaped in planform, with the cross portion of the T comprising said base portion and said upright portion of the T terminating in a generally circular loop comprising said coil portion;

said interrogator-coil circuit includes connectors on said circuit board for connecting said coil and said interrogator circuit to associated circuitry in the vehicle;

said housing is generally circularly cylindrical with a front recess comprising said loop-holding portion and a rear recess for accepting the ignition lock tumbler, wherein said circuit-holding portion comprises an outside surface of said rear recess and said base portion is wrapped around said outside surface;

a bezel secured to a front edge of said housing to hold said loop in place in said front recess; and a rear cover fitting around said base portion to secure the vehicle lock tumbler within said rear recess and holding said base portion in place on said outside surface, said rear cover including an access opening for permitting vehicle electrical connectors to be connected to said interrogator-coil circuit connectors.

13. A vehicle ignition lock assembly as in claim 12, wherein:

said housing includes a separator separating said front recess from said rear recess; and said bezel includes a flat inner portion holding said coil in place against said separator.

14. A vehicle ignition lock assembly as in claim 11, wherein:

said flexible circuit board is substantially planar and has a base portion substantially rectangular in planform with a stem extending from a side of the rectangle and terminating in a generally circular loop comprising said coil portion;

said interrogator-coil circuit includes connectors on said circuit board for connecting said coil and said interrogator circuit to associated circuitry in the vehicle;

said housing includes a generally circularly cylindrical portion with a front recess comprising said loop-holding portion and a rear recess for accepting the vehicle lock tumbler, wherein said circuit-holding portion comprises an enclosure holding said rectangular portion in a plane at an angle to a plane of said loop, said enclosure including an access opening for permitting vehicle electrical connectors to be connected to said interrogator-coil circuit connectors; and a bezel secured to a front edge of said housing to hold said loop in place in said front recess.

15. A vehicle ignition lock assembly as in claim 14, wherein:

said housing includes a separator separating said front recess from said rear recess; and said bezel includes a flat inner portion holding said coil in place against said separator.

* * * * *